United States Patent
Sandstrom

(10) Patent No.: US 7,737,204 B2
(45) Date of Patent: Jun. 15, 2010

(54) RUBBER WITH COMBINATION OF SILICA AND PARTIALLY DECARBOXYLATED ROSIN ACID AND TIRE WITH COMPONENT THEREOF

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/030,904

(22) Filed: Feb. 14, 2008

(65) Prior Publication Data

US 2009/0209690 A1 Aug. 20, 2009

(51) Int. Cl.
*C09D 11/02* (2006.01)
*C08L 23/00* (2006.01)

(52) U.S. Cl. ...................... 524/270; 524/274

(58) Field of Classification Search .................. 524/270
See application file for complete search history.

(56) References Cited

U.S. PATENT DOCUMENTS

| | | | | |
|---|---|---|---|---|
| 4,063,979 A | 12/1977 | Rongone | ................ | 156/123 R |
| 4,478,993 A * | 10/1984 | Wideman et al. | ........... | 527/600 |
| 5,840,113 A | 11/1998 | Freeman et al. | ............. | 106/487 |
| 6,046,266 A * | 4/2000 | Sandstrom et al. | .......... | 524/492 |
| 6,936,669 B2 | 8/2005 | Halasa et al. | ............... | 526/260 |
| 2003/0187110 A1 | 10/2003 | Schaal et al. | ................ | 524/114 |

OTHER PUBLICATIONS

European Search Report completed Jun. 12, 2009.

* cited by examiner

*Primary Examiner*—Ling-Siu Choi
*Assistant Examiner*—Hui Chin
(74) *Attorney, Agent, or Firm*—Henry C. Young, Jr.

(57) ABSTRACT

This invention relates to rubber compositions which contain a combination of silica reinforcement and plant-derived liquid partially decarboxylated rosin acid and to tires having components thereof, such as, for example, tire treads. Said liquid partially decarboxylated rosin acid acts both as a processing aid for the mixing of the rubber composition and as an aid to reinforcement of the rubber composition by interaction with the silica in situ within the rubber composition.

2 Claims, No Drawings

RUBBER WITH COMBINATION OF SILICA AND PARTIALLY DECARBOXYLATED ROSIN ACID AND TIRE WITH COMPONENT THEREOF

FIELD OF THE INVENTION

This invention relates to rubber compositions which contain a combination of silica reinforcement and plant-derived liquid partially decarboxylated rosin acid and to tires having components thereof, such as, for example, tire treads. Such liquid partially decarboxylated rosin acid acts both as a processing aid for the mixing of the unvulcanized rubber composition and as an aid to reinforcement of the vulcanized rubber composition by interaction with the silica in situ within the rubber composition.

BACKGROUND

In practice, it may sometimes be desirable to increase use of plant-derived processing aids for preparation of rubber compositions by reducing use of petroleum based processing aids for such purpose.

This invention provides a way to utilize a plant-derived rubber processing aid in a rubber composition which contains silica reinforcement.

In practice, petroleum based rubber processing oils are often used to aid in the processing of unvulcanized rubber compositions by reducing their mixing viscosity (e.g. Mooney viscosity).

While non petroleum, plant-derived rosin acids may be candidates for unvulcanized rubber processing aids, the high acid group content of rosin acids have an effect of retarding amine accelerated sulfur cure of the associated rubber composition (because of interaction of its high level of acid groups with amine based sulfur cure accelerators) which significantly limits the suitability of use of rosin acids for such purpose.

Decarboxylated rosin acids (with significantly reduced acid group content) have been suggested for use as processing aids for carbon black reinforced rubber compositions (which can have a reduced effect of retarding the sulfur curing of the rubber composition because of their reduced acid group content). For example, see U.S. Pat. No. 4,478,993.

However, use of partially decarboxylated rosin acids (which thereby retain a portion of their acid groups because they are not completely decarboxylated) in rubber compositions which contain silica reinforcement are envisioned herein to promote significant advantageous effects, particularly for components for articles of manufacture such as tires.

For this invention, liquid partially decarboxylated rosin acids, which might be referred to as "rosin oils", are provided as processing aids (to reduce unvulcanized rubber mixing viscosity) in rubber compositions which contain silica reinforcement where the partially decarboxylated rosin acids contain a range of acidity values (range of acid group content) for which its acid groups are relied upon to interact with hydroxyl groups (e.g. silanol groups) contained on synthetic, amorphous silica (e.g. precipitated silica) and to thereby provide a bridging network between the silica and the rosin oil within a vulcanized rubber composition with the rosin oil thereby being in a sense anchored to the silica.

In this manner, then, it is envisioned that a tertiary network is formed in situ within the rubber in addition to a silica/rubber network and silica/silica coupler network not found with a rubber composition which is reinforced solely with rubber reinforcing carbon black filler.

Accordingly, such rubber composition is envisioned as containing a bridge network comprised of a product of an interaction of acid groups of said partially decarboxylated rosin acid with hydroxyl groups of said precipitated silica.

Further, rosin acids themselves are normally in a nature of being solid materials in a sense of having a softening point of, for example, about 85° C. and therefore solid at room temperature (about 23° C.) which are considered herein as not significantly improving the processing effect of petroleum based rubber processing oils for already mixed unvulcanized rubber compositions such as, for example, for shaping (e.g. extruding) prepared rubber compositions.

As previously discussed, the significantly high acid group content of the rosin acids (e.g. acid number of about 160) has been observed to retard the rate and state of sulfur cure of conjugated diene-based rubber compositions, where an amine based sulfur cure accelerator is used, which is typically an unwanted feature. The acid number of rosin acids, as well as partially decarboxylated rosin acids, may be calculated based upon milligrams of KOH (potassium hydroxide contained in a water solution) required to neutralize 1 gram of the rosin acid. For example, it typically takes about 160 milligrams of KOH to neutralize one gram of a typical rosin acid to therefore yield an acid number of 160.

In contrast, for this invention, it is believed that use of non-petroleum, plant derived partially decarboxylated rosin acids (for example, partially decarboxylated wood rosin acids) in a sense of being liquid and having a significantly reduced acid number as a total or partial replacement for conventionally used petroleum based rubber processing oils in a rubber composition which contains silica reinforcement is novel and a significant departure from past practice.

Historically, rosin acid is a solid resinous material which contains a high concentration of carboxylic acid groups which occurs naturally in pine trees. There are three major exemplary sources of the rosin acid, namely:

(A) gum rosin acid, which might be referred to as "rosin", is from the oleoresin extrudate of the living pine tree, (B) wood rosin acid, which might be referred to as "wood rosin" or "rosin", is from the oleoresin contained in the aged pine tree stumps; and (C) tall oil rosin acid, which might be referred to as "rosin", is from the waste liquor recovered as a by-product in the paper production industry.

For example, wood rosin may be obtained from aged pine tree stumps. In such practice, a pine tree stump may be allowed to remain in the ground for a number of years so that its bark and sapwood may decay and slough off to leave the heartwood rich in rosin acid, which might sometimes be referred to as "wood rosin".

Historically, rosin acids derived from both oleoresin and aged pine tree stump wood are typically composed of, for example, about 90 percent rosin acids and, for example, about 10 percent nonacidic components.

Representative of various wood rosin acids are, for example, rosin acids referred to as abietic, levopimaric, neoabietic, palustric, dehydroabietic, dihydroabietic, tetrahydroabietic, pimaric, isopimaric, elliotinoic and sandaracopimaric.

Liquid decarboxylated rosin acids (rosin oils) have been produced by the decomposition of rosin acids at high temperatures. For example, the rosin oil (decarboxylated rosin acid) may be produced, for example, by the treatment of rosin acid at an elevated temperature which may optionally be, for example, in the presence of hydriodic acid or iron turnings.

According to the concepts of the present invention, it has been discovered that a type, or class, of non petroleum, naturally occurring plant-derived rosin acids can be partially decarboxylated to form a rosin oil and then be partially or fully substituted for petroleum based rubber processing oils utilized in various rubber compositions. Such various petroleum based rubber processing oils include, for example, aromatic oils, naphthenic oil, paraffinic oils, and blends thereof.

Rubber processing oils may be composed of, for example, naphthenic and alkylated naphthenic hydrocarbons and mixtures thereof with various aromatic hydrocarbon containing oils which are well known to those having skill in such art. They may comprise distillate fractions boiling above about 200° C. Suitable fractions are those at least 90 percent of which boil above about 250° as more volatile members may be lost during or after compounding and curing the rubber.

The present invention further contemplates the use of partially decarboxylated plant-derived rosin acids, particularly which have an acid number of no more than 30 as a partial or full replacement of customary petroleum based rubber processing oils (including petroleum based oils rubber extending oils) in rubber compositions.

The carboxylic acid containing rosin acids themselves are, in general, a composite of a mixture of molecules, some of which contain monocarboxylic acids typically comprised of a general molecular formula such as, for example, $C_{20}H_{30}O_2$. The names of various individual rosin acids has varied somewhat over the years. For example, in addition to trivial names, names such as for example, abietic acid have sometimes been used.

The carboxylic acid containing rosin acid molecule contained in the rosin acid composite of rosin acids, in general contains two chemically reactive moieties, namely a carboxylic acid group and carbon-to-carbon double bonds which might sometimes be referred to more simply as "double bonds". Through such reactive moieties, many modifications in structure and numerous derivatives are obtainable for the rosin acids. Because an individual rosin acid is typically a composite composed of a number of rosin acid molecules and a number of molecules which do not contain carboxylic acids, the chemistry of its reactions is relatively complex.

Therefore, in addition to various carboxylic acid related chemical reactions, double bond related reactions or interactions may also occur.

The rosin acid's carboxyl group is typically of a structurally hindered nature which typically makes it necessary to use high temperatures or other significant conditions to bring about its decarboxylation.

The present invention relates to the use of liquid partially decarboxylated rosin acid as a partial or complete replacement of petroleum based rubber processing oils, including rubber extender oils, in rubber compositions, particularly for tire components, which contain silica reinforcement. Its usefulness relies, in part, upon an interaction between acid groups of the partially decarboxylated rosin acid and hydroxyl groups of the silica reinforcement to form a bridging silica network within the rubber composition.

In such practice of using liquid partially decarboxylated rosin acid in silica reinforcement-containing rubber compositions, particularly for tire components and particularly for tire treads, considerations such as for example acid number (carboxylic acid content) are a factor to be taken into consideration. As a result, for this invention, a liquid partially decarboxylated rosin acid (rosin oil) of a low acid number, (significantly lower than a typical acid number for rosin acid such as, for example, about 160) in a range of from about 2 to about 30, alternately from about 4 to about 15, is provided for promoting a combination of a beneficial interaction effect with the silica reinforcement within the rubber composition to promote cured rubber properties as well as a beneficial rubber processing effect for the uncured rubber composition without significantly affecting the rubber composition's rate and state of cure.

In the description of this invention, the terms "rubber" and "elastomer" where used herein, are used interchangeably, unless otherwise prescribed. The terms "rubber composition", "compounded rubber" and "rubber compound", where used herein, are used interchangeably to refer to "rubber which has been blended or mixed with various ingredients" and the term "compound" relates to a "rubber composition" unless otherwise indicated. Such terms are well known to those having skill in the rubber mixing or rubber compounding art.

In the description of this invention, the term "phr" refers to parts of a respective material per 100 parts by weight of rubber, or elastomer. The terms "cure" and "vulcanize" are used interchangeably unless otherwise indicated.

The term "rosin oil" may be used to refer to a partially decarboxylated rosin acid.

DISCLOSURE AND PRACTICE OF THE INVENTION

In accordance with this invention a rubber composition is provided which comprises, based upon parts by weight per 100 parts by weight rubber (phr):

(A) at least one conjugated diene-based elastomer;

(B) from about 20 to about 120, alternately from about 35 to about 100, phr of at least one rubber reinforcing filler comprised of:
  (1) about 20 to about 120, alternately from about 30 to about 95, phr of precipitated silica which contains hydroxyl groups (e.g. silanol groups), and
  (2) from zero to about 60, alternately from about 5 to about 50, phr of rubber reinforcing carbon black;

(C) coupling agent for said silica having a moiety reactive with hydroxyl groups (e.g. silanol groups) on said precipitated silica and another different moiety interactive with said conjugated diene-based rubber(s); and (D) from about 2 to about 120, alternately from about 5 to about 100, phr of rubber processing oil comprised of:
  (1) from about 2 to about 120, alternately from about 3 to about 95, phr of at least one partially decarboxylated rosin, wherein said partially decarboxylated rosin is a rosin oil having an acid number in a range of from about 2 to about 30, alternately from about 4 to about 15, and
  (2) from zero to about 120, alternately from about 2 to about 95, phr of petroleum based rubber processing oil.

As hereinbefore indicated, the acid number of a partially decarboxylated rosin acid may be determined by the mg of KOH needed to neutralize 1 gram of the partially decarboxylated rosin acid which is an indication of its acid group content.

Accordingly, it is required that the rosin acid is not completely decarboxylated in order that it contains a limited quantity of acid groups (indicated by its limited acid number range), to facilitate an interaction of the liquid partially decarboxylated rosin acid with the silica. In such manner, then, the partially decarboxylated rosin acid is both a liquid to promote processing of the uncured rubber and also interactive with the silica by interaction of its acid groups with the silica hydroxyl groups.

In an additional practice of this invention, then, the rubber composition is provided in which a portion of its petroleum based rubber processing oil is replaced (e.g. from about 5 to about 100 weight percent of the rubber processing oil, depending somewhat upon the rubber composition itself and desired rubber viscosity as well as the nature of the rubber processing oil) with the liquid non petroleum, agricultural plant based partially decarboxylated rosin acid.

In further accordance with this invention, a tire is provided having at least one component comprised of such rubber composition, namely said rubber composition which contains a combination of silica reinforcement, particularly precipitated silica, and said partially decarboxylated rosin acid interacted with said silica, particularly where such interaction is provided in situ within the rubber composition.

Such tire components may be, external tire rubber components (e.g. tire components which are visually exposed to atmospheric conditions such as, for example, ozone, ultraviolet light and water) and internal tire components (e.g. tire components which are not normally visually exposed) which are subjected to internal heat generating flexing (thus experiencing increased temperature conditions) during the working of the tire.

Representative of various external tire rubber components are, for example, tire tread with a running surface (surface intended to be ground-contacting), tire sidewalls and chafer.

Representative of various internal tire rubber components are, for example, tire tread base, or sub-tread, layers (rubber layer underlying the outer visually exposed tread with running surface), rubber encapsulated, cord reinforced, carcass ply, rubber encapsulated circumferential cord reinforced belt, and tire innerliner.

A significant aspect of this invention is the rubber composition which contains rubber reinforcing silica with its hydroxyl groups interacted with the liquid partially decarboxylated rosin acid with its indicated acid number range, particularly where the rubber composition also contains a silica coupling agent which is interactive with hydroxyl groups contained on the rubber reinforcing silica (e.g. precipitated silica).

This is considered herein to be significant in the sense of providing a combined benefit of the liquid partially decarboxylated plant-derived rosin acid acting as a non petroleum based rubber processing oil for the uncured rubber composition which does not significantly, if at all, affect the sulfur cure rate or state of cure for the diene-based elastomer containing rubber composition and also providing an interaction with the silica to promote enhanced physical properties of the cured rubber composition.

Rubber reinforcing carbon blacks may be found, for example, in *The Vanderbilt Rubber Handbook*, Thirteenth Edition (1990), Page 417.

Numerous coupling agents may be used for coupling silica (e.g. participated silica) and diene-based elastomers may be used in the practice of this invention for coupling the silica to the conjugated diene-based elastomer(s), particularly such couplers where the moiety for interacting with the elastomer is a polysulfide and the moiety for reacting with the silica (e.g. silanol groups) is an alkoxy silane. For example, various alkoxysilane-based coupling agents might be used which contain a polysulfide bridge such as, for example, bis(3-trialkoxysilylalkyl)polysulfide having from about 2 to about 8, usually an average of about 2 to about 5, sulfur atoms in the polysulfidic bridge, particularly an average in a range of about 2 to about 2.5 or about 3.5 to about 4, where such alkyl groups may be selected from, for example, methyl, ethyl and propyl radicals, with the alkoxy groups preferably being selected from methoxy and ethoxy groups. A representative example could be comprised of bis(3-triethoxysilylpropyl)polysulfide. Various types of such silica coupling agents are well known to those having skill in such art.

Organomercaptoalkoxy silanes may also be used as coupling agents, particularly capped organomercaptoalkoxy silanes where their mercapto group is chemically capped which becomes uncapped within the rubber composition at an elevated temperature (e.g. during sulfur vulcanization of the rubber composition), usually in the presence of amine based sulfur vulcanization accelerator. Various types of such silica coupling agents are well known those having skill in such art.

While the various synthetic amorphous rubber reinforcing silicas include pyrogenic and precipitated silicas, the synthetic amorphous silicas (precipitated silicas) are usually preferred such as those obtained by processes which including the acidification of a soluble silicate, for example sodium silicate and precipitation of silica aggregates therefrom.

The precipitated silica may have, for example, a BET surface area, as measured using nitrogen gas, in a range of from about 80 to about 300, although more typically in a range of about 100 to about 200, although perhaps even up to about 360, square meters per gram. Methods of measuring silica surface area with nitrogen gas is well known by those having skill in such art.

The precipitated silica may have, for example, a dibutylphthalate (DBP) absorption value in a range of about 150 to about 350, and usually about 200 to about 300 cc/100 gm.

Various rubber reinforcing silicas may be used in this invention such as, for example, and without limitation, silicas commercially available from PPG Industries under the Hi-Sil trademark with designations 210, 243, etc; silicas available from Rhodia, such as, for example, Zeosil 1165MP™ and silicas available from Degussa AG with designations such as, for example, VN2, VN3, BV 3370GR and silicas from J. M Huber company such as, for example, Hubersil 8745™.

Representative elastomers for use in this invention are for example, elastomers comprised of polymers of at least one of isoprene and 1,3-butadiene and copolymers of styrene with at least one of isoprene and 1,3-butadiene.

Representative of such elastomers are, for example, cis 1,4-polyisoprene (natural and synthetic), cis 1,4-polybutadiene, high vinyl polybutadiene having a vinyl content in a range of from about 30 to about 90, styrene/butadiene copolymers (organic solution polymerization and aqueous emulsion polymerization derived), styrene/isoprene copolymers, styrene/isoprene/butadiene terpolymers.

The various elastomers, particularly organic solution polymerization prepared elastomers, can be coupled with tin or silica. The various elastomers may be produced with, and therefore contain, functional groups. Such coupling and functionalization of the elastomers is well known to those having skill in such art.

The tin and silicon coupling of elastomers (e.g. with, for example tin or silicon tetrachloride), and therefore tin and silicon coupled elastomers, are well known to those having skill in such art.

Various functionalized elastomers may be, for example, functionalized styrene/butadiene copolymer elastomers (functionalized SBR elastomers) containing amine and/or siloxy (e.g. alkoxy silane) functional groups.

Representative of amine functionalized SBR elastomers are, for example, SLR4601™ from Dow Chemical and T5560™ from JSR, and in-chain amine functionalized SBR elastomers mentioned in U.S. Pat. Nos. 6,735,447 and 6,936,669.

Representative of siloxy functionalized SBR elastomers is, for example, SLR4610™ from Dow Chemical.

Representative of such combination of amine and siloxy functionalized SBR elastomers is, for example, HPR350™ from JSR.

Other and additional elastomers are functionalized styrene/butadiene copolymer elastomers (functionalized SBR elastomers) containing hydroxy or epoxy functional groups.

Representative of hydroxy functionalized SBR elastomers is, for example, Tufdene 3330™ from Asahi.

Representative of epoxy functionalized SBR elastomers is, for example, Tufdene E50™ from Asahi.

The rubber composition containing the silica reinforcement and partially decarboxylated rosin acid (rosin oil) of this invention may contain conventional amounts of conventional ingredients as would be known to those having skill in such art.

For example, various tackifier resins might be used, if desired, in an amount, for example, of about 0.5 to about 10 phr, alternately about 1 to about 5 phr. Antioxidants may be used if desired in an amount of, for example, about 1 to about 5 phr. Representative antioxidants may be, for example, diphenyl-p-phenylenediamine and others such as, for example, those disclosed in *The Vanderbilt Rubber Handbook* (1978), Pages 344 through 346. Antiozonants may be used, if desired, in an amount, for example, of about 1 to 5 phr. Typical amounts of fatty acids, if used, which are usually comprised primarily of stearic acid, comprise, for example, from about 0.5 to about 3 phr. Typical amounts of zinc oxide comprise, for example, from about 2 to about 5 and sometimes up to about 8 phr. Typical amounts of crystalline waxes, if used, may comprise for example from about 1 to about 5 phr. Various peptizers may be used, if desired, which may comprise for example from about 0.1 to about 1 phr. Typical peptizers may be comprised of, for example, pentachlorothiophenol and dibenzamidodiphenyl disulfide.

The vulcanization of the rubber composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents might be used, for example, in an amount ranging from about 0.5 to about 4 phr, or even, in some circumstances, up to about 8 phr, alternately in a range of from about 1.5 to about 2.5 phr, depending somewhat upon the rubber composition and its intended use.

Sulfur cure accelerators are used to control the time and/or temperature required for vulcanization and to improve the properties of the vulcanizate (cured rubber). In one embodiment, a single accelerator system may be used, i.e., primary accelerator. Conventionally and preferably, a primary accelerator(s) might be used in total amounts, for example, ranging from about 0.5 to about 4, alternately about 0.8 to about 2, phr. In another embodiment, combinations of a primary and a secondary accelerator might be used with the secondary accelerator being used in amounts of, for example, from about 0.05 to about 0.5 phr in order to activate and to improve the properties of the vulcanizate. Combinations of such accelerators might produce a synergistic effect on the final properties and may be somewhat better than those produced by use of either accelerator alone. In addition, delayed action accelerators might be used, if desired, which are not affected by normal processing temperatures but produce a satisfactory cure at ordinary vulcanization temperatures. Vulcanization retarders might also be used, if desired. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of most of the above additives are not considered to be an aspect of the present invention, unless otherwise indicated.

The rubber composition containing diene-based rubber diene-based rubber, rubber reinforcing silica, rubber reinforcing carbon black, if used, and partially decarboxylated rosin oil and other rubber compounding ingredients, exclusive of the rubber curatives, may be prepared in at least one sequential mixing step with at least one mechanical mixer (e.g. internal rubber mixer), usually referred to as "non-productive" mix stage(s), to a temperature in a range of, for example, about 150° C. to about 180° C. for a period of, for example, from 2 to about 10 minutes, followed by a final mix stage in which the curatives, such as sulfur and accelerators, are added and mixed therewith for a period of, for example, about 1 to about 4 minutes to a temperature of, for example, within a range of about 90° C. to about 125° C. The terms "non-productive" and "productive" mix stages are well known to those having skill in the rubber mixing art.

It is to be appreciated that the rubber composition is conventionally cooled to a temperature of, for example, below about 40° C. between the aforesaid mix stages.

It is to be further appreciated that the aforesaid duration of time for the required temperature maintenance for the mixing process(es) during the non-productive mix stages can be accomplished, for example, by (A) adjusting the motor speed of the mixer, namely reducing the motor speed after the desired temperature of the rubber composition is reached, in a variable speed mixer or by (B) utilizing two or more mix stages sufficient to satisfy the duration requirement for the aforesaid maximum mixing temperature maintenance.

Vulcanization of the rubber composition of the present invention, particularly an article (e.g. tire) containing a component comprised of the rubber composition, may generally be carried out at conventional vulcanization temperatures ranging, for example, from about 140° C. to about 180° C. Usual vulcanization processes include, for example heating in a press or mold with an expandable cure bladder and, for example, superheated steam or hot air or in a salt bath.

Upon vulcanization of the sulfur-vulcanized composition, the rubber composition of this invention can be useful for various purposes, particularly for various components of a vehicular tire. For example, the sulfur-vulcanized rubber composition containing the combination of interacting reinforcing silica and partially decarboxylated rosin acid may be in the form of a tread for a pneumatic tire which is an important use for this invention. Such tires can be built, shaped, molded and cured by various methods which are known and will be readily apparent to those having skill in such art. As can be appreciated, the tire may be, for example, a passenger tire, aircraft tire, truck tire and the like. The tire may be, for example, a radial or bias tire, with a radial tire usually being preferred.

It is to be appreciated that the rubber composition may be used for components of other articles of manufacture (rubber products) such as, for example industrial belts, including conveyor belts and power transmission belts, and hoses.

The following Examples are provided for a further understanding of the invention. The parts and percentages are by weight unless otherwise indicated.

EXAMPLE I

Inclusion of a partially decarboxylated rosin acid in rubber compositions which contain silica reinforcement was undertaken to evaluate an effect of fully or partially replacing conventional petroleum based rubber processing oil with a partially decarboxylated plant-derived rosin oil.

For this Example, Rubber Samples A through D are reported.

Rubber Sample A is a Control rubber sample comprised of a cis 1,4-polyisoprene rubber containing silica reinforcement which contained a petroleum based rubber processing oil without a partially decarboxylated rosin acid.

Experimental Rubber Samples B through D are rubber samples comprised of cis 1,4-polyisoprene rubber based rubber compositions which contained silica reinforcement in which progressive (increasing) amounts of the partially decarboxylated rosin acid are used ranging from 6 parts for Sample B, 12 parts for Sample C and 18 parts for Sample D.

The rubber compositions were prepared by mixing the ingredients in several stages, namely, two sequential non-productive (NP) stages (without the curatives) followed by a productive (P) mix stage (for adding the curatives).

For the non-productive mixing stages, the ingredients are mixed in an internal rubber mixer for about four minutes to a temperature of about 160° C. In the final productive mixing stage, the curatives are mixed with the rubber compositions in an internal rubber mixer to a temperature of about 110° C. for about three minutes.

The resulting rubber compositions were then vulcanized at a temperature of about 150° C. for about 30 minutes.

The following Table 1 relates to the ingredients used for the Control Sample A and Experimental Samples B through D.

TABLE 1

| Materials | Control Sample A | Sample B | Sample C | Sample D |
|---|---|---|---|---|
| First non-productive mixing (NP1) | | | | |
| Cis 1,4-polyisoprene rubber[1] | 100 | 100 | 100 | 100 |
| Rubber reinforcing carbon black[2] | 30 | 30 | 30 | 30 |
| Aromatic rubber processing oil[3] | 18 | 12 | 6 | 0 |
| Decarboxylated rosin acid[4] | 0 | 6 | 12 | 18 |
| Antioxidant | 2 | 2 | 2 | 2 |
| Zinc oxide | 5 | 5 | 5 | 5 |
| Fatty acid[5] | 2 | 2 | 2 | 2 |
| Precipitated Silica[6] | 15 | 15 | 15 | 15 |
| Silica coupling agent[7] | 3 | 3 | 3 | 3 |
| Second non-productive mixing (NP2) | | | | |
| Precipitated silica[6] | 15 | 15 | 15 | 15 |
| Silica coupling agent[7] | 2 | 2 | 2 | 2 |
| Productive mixing (P) | | | | |
| Sulfur | 1.4 | 1.4 | 1.4 | 1.4 |
| Accelerator(s)[8] | 2.2 | 2.2 | 2.2 | 2.2 |

[1]Synthetic cis 1,4-polyisoprene rubber as NAT 2200 ™ from the Goodyear Tire & Rubber Company
[2]N229, an ASTM designation
[3]As Texaco 2202 Textrac ™ from Motiva Enterprises
[4]Partially decarboxylated rosin acid in the form of an oil having an acid number of about 6 as ODC-587 ™ from the MeadWestvaco Company
[5]Primarily stearic acid (e.g. at least 90 weight percent stearic acid)
[6]HiSil 210 ™ silica from the PPG Industries Company
[7]As Si266 ™ from the Degussa company as composite of silica coupler and carbon black in a 50/50 weight ratio, and reported in Table 1 as the composite and therefore "50 percent active", where the silica coupler is comprised of a bis(3-triethoxysilylpropyl) polysulfide with an average in a range of from about 2.1 to about 2.6 connecting sulfur atoms in its polysulfidic bridge
[8]Sulfenamide and diphenylguanidine sulfur cure accelerators The physical properties for the resulting vulcanized rubber compositions are shown in the following Table 2.

The various tests employed are considered herein to be well known to those having skill in such analytical art.

TABLE 2

| Materials | Control Sample A | Sample B | Sample C | Sample D |
|---|---|---|---|---|
| Partially decarboxylated rosin acid | 0 | 6 | 12 | 18 |
| Aromatic Processing Oil | 18 | 12 | 6 | 0 |
| Rheometer, 150° C. (MDR)[1] | | | | |
| Max Torque (dNm) | 17.1 | 16.6 | 16.7 | 16.8 |
| Min Torque (dNm) | 2.4 | 2.3 | 2.4 | 2.2 |
| Delta Torque (dNm) | 14.7 | 14.3 | 14.4 | 14.6 |
| T90 (minutes) | 14.8 | 15.2 | 13.8 | 14.0 |
| Stress-Strain (ATS)[2] | | | | |
| Tensile strength (MPa) | 20.7 | 20.4 | 20.7 | 20 |
| Elongation at break (%) | 576 | 578 | 571 | 562 |
| 300% modulus (MPa) | 8.64 | 8.44 | 8.79 | 9.07 |
| Rebound | | | | |
| 23° C. | 46.1 | 43.8 | 46.3 | 44.3 |
| 100° C. | 61.9 | 61.4 | 61.7 | 61.3 |
| Hardness, Shore A | | | | |
| 23° C. | 67 | 67 | 68 | 69 |
| 100° C. | 62 | 62 | 64 | 64 |
| RPA[3], 150° C., 10% strain, 1 Hz | | | | |
| Uncured Storage modulus (G'), MPa | 1.45 | 1.43 | 1.42 | 1.4 |
| Tan delta | 0.120 | 0.126 | 0.113 | 0.117 |
| Tear Strength[4], 95° C., Newtons (N) | 148 | 175 | 176 | 176 |
| DIN abrasion[5], relative volume loss | 134 | 108 | 111 | 102 |

[1]Moving Die Rheometer instrument by Alpha Technologies, used for determining cure characteristics of elastomeric materials, such as for example torque, T90 etc.
[2]Automated Testing System instrument by the Instron Corporation which incorporates six tests in one system. Such instrument may determine ultimate tensile, ultimate elongation and modulii, etc. Data reported in the Table is generated by running the ring tensile test.
[3]Data obtained according to Rubber Process Analyzer instrument by Alpha Technologies.
[4]Data obtained according to a peel strength adhesion test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument. The area of contact at the interface between the rubber samples is facilitated by placement of a Mylar ™ film between the samples with a cut-out window in the film to enable the two rubber samples to contact each other following which the samples are vulcanized together and the resultant composite of the two rubber compositions are used for the peel strength test.
[5]DIN-53516 reported as relative volume loss From Table 2 it can be seen that various physical properties such as torque, tensile strength, modulus, elongation, hardness and Mooney viscosity of Experimental Samples B through D were comparable to those of the Control Sample A and therefore mostly unaffected by the progressive replacement of the petroleum based rubber processing oil with the non petroleum, plant-based partially decarboxylated rosin oil in the precipitated silica-containing rubber composition.

This indicates that the substitution can be made without loss of significant cured properties for the cured precipitated silica-containing rubber which also contained rubber reinforcing carbon black and coupling agent for the precipitated silica.

However, the effect of substituting the partially decarboxylated rosin acid (rosin oil) on tear strength and abrasion resistance was significant and relatively dramatic.

For the tear strength, it is seen that as the replacement level of the partially decarboxylated rosin acid (rosin oil) increased, the tear strength progressively and beneficially increased for Experimental rubber Samples B, C and D as compared to the Control rubber Sample A.

This is considered herein as being significant in the sense of indicating that the Experimental rubber compositions (Samples B, C and D) would present improved durability performance as internal and external rubber tire components composed of rubber compositions containing silica reinforcement.

For the abrasion resistance, it is seen that as the replacement level of the partially decarboxylated rosin acid (rosin oil) increased, the abrasion resistance property progressively improved (less wear), as seen by the reduction in rubber volume loss for rubber Samples B, C and D as compared to Control rubber Sample A.

This is considered herein as being significant in the sense of indicating that that the Experimental rubber compositions (Samples B, C and D) would present improved wear resistance as external tire rubber components which contain precipitated silica reinforcement such as, for example, tire treads where longer wearing tire treads is desired.

A significant aspect of this Example is that the beneficial tear resistance and wear resistance properties were obtained by substituting a non petroleum plant-derived partially decarboxylated rosin acid (rosin oil) for a petroleum based rubber processing oil in a silica reinforcement-containing rubber composition. Apparently, the carboxylic acid groups of the rosin oil are allowed to interact with the precipitated silica to form a bridging network composed of the rosin oil and precipitated silica in situ within the rubber composition to achieve these beneficial results for the sulfur vulcanized rubber composition, a feature not obtainable for a rubber composition which contains carbon black reinforcement without silica reinforcement.

While certain representative embodiments and details have been shown for the purpose of illustrating the invention, it will be apparent to those skilled in this art that various changes and modifications may be made therein without departing from the scope of the invention.

What is claimed is:

1. A tire having a component of a rubber composition which comprises, based upon parts by weight per 100 parts by weight rubber (phr):

(A) at least one conjugated diene-based elastomer;
(B) from about 20 to about 120 phr of at least one rubber reinforcing filler comprised of a combination of:
   (1) about 30 to about 95 phr of precipitated silica which contains hydroxyl groups, and
   (2) from 5 to about 50 phr of rubber reinforcing carbon black;
(C) coupling agent for said silica having a moiety reactive with hydroxyl groups on said precipitated silica and another different moiety interactive with said conjugated diene-based elastomer(s); and
(D) from about 2 to about 120 phr of rubber processing oil comprised of:
   (1) from about 3 to about 95 phr of at least one liquid partially decarboxylated rosin acid, wherein said partially decarboxylated rosin acid is a rosin oil having an acid number in a range of from about 4 to about 5, and
   (2) from about 2 to about 30 phr of petroleum based rubber processing oil;

wherein said rosin acid for said partially decarboxylated rosin oil is comprised of at least one of non-petroleum, plant derived:
(A) gum rosin acid from pine tree oleoresin extrudate,
(B) wood rosin acid oleoresin from aged pine tree stumps, and
(C) tall oil rosin acid;

wherein said elastomers are comprised of at least one of cis 1,4-polyisoprene, cis 1,4-polybutadiene, styrene/butadiene copolymers, styrene/isoprene copolymers and styrene/isoprene/butadiene terpolymers.

2. The tire of claim 1 wherein said silica coupling agent is comprised of at least one of a bis(3-trialkoxysilylalkyl) polysulfide having an average of about 2 to about 5, sulfur atoms in the polysulfidic bridge; and organomercaptoalkoxy silanes.

* * * * *